United States Patent
Mohanty et al.

(10) Patent No.: US 11,171,928 B2
(45) Date of Patent: Nov. 9, 2021

(54) LOCAL PEER TO PEER DIRECT CONNECTION IN NETWORK ADDRESS TRANSLATOR (NAT) AND OVERLAY NETWORKS

(71) Applicant: COLORTOKENS, INC., Santa Clara, CA (US)

(72) Inventors: Deepak Kumar Mohanty, Santa Clara, CA (US); Ashish Trivedi, Santa Clara, CA (US); Ravi Voleti, Santa Clara, CA (US); Anoop Kapoor, Santa Clara, CA (US); Mritunjay Kumar, Santa Clara, CA (US); Suprio Pal, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 385 days.

(21) Appl. No.: 16/211,751

(22) Filed: Dec. 6, 2018

(65) Prior Publication Data
US 2020/0186496 A1    Jun. 11, 2020

(51) Int. Cl.
| G06F 9/00 | (2006.01) |
| G06F 15/16 | (2006.01) |
| G06F 17/00 | (2019.01) |
| H04L 29/06 | (2006.01) |

(Continued)

(52) U.S. Cl.
CPC ........ *H04L 63/029* (2013.01); *H04L 61/2007* (2013.01); *H04L 61/256* (2013.01); *H04L 63/0435* (2013.01); *H04L 67/1061* (2013.01)

(58) Field of Classification Search
CPC .............. H04L 63/029; H04L 67/1061; H04L 63/0435; H04L 61/2007; H04L 61/256; H04L 61/2517; H04L 61/2514; H04L 61/2589; H04L 29/06755; H04W 12/06; H04W 12/08–088; G06F 21/00; G06F 21/30–31; G06F 21/44–445
See application file for complete search history.

(56) References Cited

U.S. PATENT DOCUMENTS

2004/0034776 A1* 2/2004 Fernando ................. H04L 9/321
                                                713/171
2005/0004968 A1* 1/2005 Mononen ............... H04L 69/161
                                                709/200

(Continued)

*Primary Examiner* — Amie C. Lin
(74) *Attorney, Agent, or Firm* — Barry Choobin; Patent 360LLC

(57) ABSTRACT

In a method of Local Peer to Peer Direct Connection in NAT and overlay network. A request is received from a first peer at a relay gateway to establish a direct connection with a second peer. The first peer and the second peer are located behind a NAT firewall. An authentication request is relayed from the first peer at the relay gateway. The authentication request is forwarded from the relay gateway to the second peer. Upon performing authentication at the second peer, an authentication response is received at the relay gateway. The authentication response is received from the relay gateway at the first peer. An internal route propagation is performed from the second peer to the first peer via the relay gateway. A Local Peer to Peer Direct Connection is established between the first peer and the second peer for packet flow through the direct connection.

10 Claims, 7 Drawing Sheets

(51) Int. Cl.
  *H04L 29/08*  (2006.01)
  *H04L 29/12*  (2006.01)

(56) References Cited

U.S. PATENT DOCUMENTS

| | | | |
|---|---|---|---|
| 2006/0037072 A1* | 2/2006 | Rao ........................ | H04L 47/10 726/14 |
| 2008/0046740 A1* | 2/2008 | Narayanan ............ | H04L 63/083 713/176 |
| 2010/0014536 A1* | 1/2010 | Lin ................... | H04L 29/12509 370/410 |
| 2011/0082939 A1* | 4/2011 | Montemurro ........... | H04L 69/24 709/227 |
| 2011/0231491 A1* | 9/2011 | Hautakorpi ....... | H04L 29/12094 709/204 |
| 2012/0096172 A1* | 4/2012 | Tyukasz ............ | H04L 29/08099 709/227 |

* cited by examiner

LOCAL PEER TO PEER DIRECT CONNECTION IN NETWORK ADDRESS TRANSLATOR (NAT) AND OVERLAY NETWORKS

BACKGROUND

Network address translation (NAT) is the process of modifying the IP source address and optionally the source port information in Layer 3/Layer 4 packet header so that packets can be routed to the required destination and the response if any can reach the connection initiator. NAT is used in routers to allow a number of devices each with their own private network address to connect to the public Internet. The combination of the NAT process along with routers also acting as firewalls is referred to as NAT firewall. This solution is useful in the context of two peers trying to establish a securely overlay connection with each other in a NAT environment. There are two basic means of data flow between peers in an overlay network namely, direct connection and indirect connection. In direct connection mode, the peers exchange packets directly via an IP network. In indirect connection mode, the packets get forwarded via an intermediary gateway with a pre-configured, public IP address and port. NAT/firewall traversal aided by the gateway leads to direct connection between peers if the NAT/firewalls are endpoint independent.

In this peer to peer direct connection (PPDC) the route gateway then aids the peers in discovering each other's internal and external address. PPDC requires at least one of the peer be behind a NAT and configured in one of the modes such as restricted cone, address restricted cone and port restricted cone. NAT firewall traversal using a route gateway is not possible if at least one of (a) NATs are not endpoint independent and (b) UDP hole punching is not allowed by the firewall. PPDC uses Session traversal utilities for NAT (STUN), a standardized set of methods for traversal of NAT gateways. STUN helps connect end points determine each other's public IP address. In peer to peer indirect connection (PPIC), a relay gateway lets peers behind NATs discover each other and establish an indirect connection. Indirect connection has various disadvantages such as the gateway acting as a bottleneck during packet transfer, gateway going down disrupts connectivity, etc. PPIC uses a set of methods collectively known as Traversal Using Relay around NAT (TURN). Session traversal utilities for NAT (STUN) is a standardized set of methods for traversal of NAT gateways.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of Local Peer to Peer Direct Connection in NAT and overlay network are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
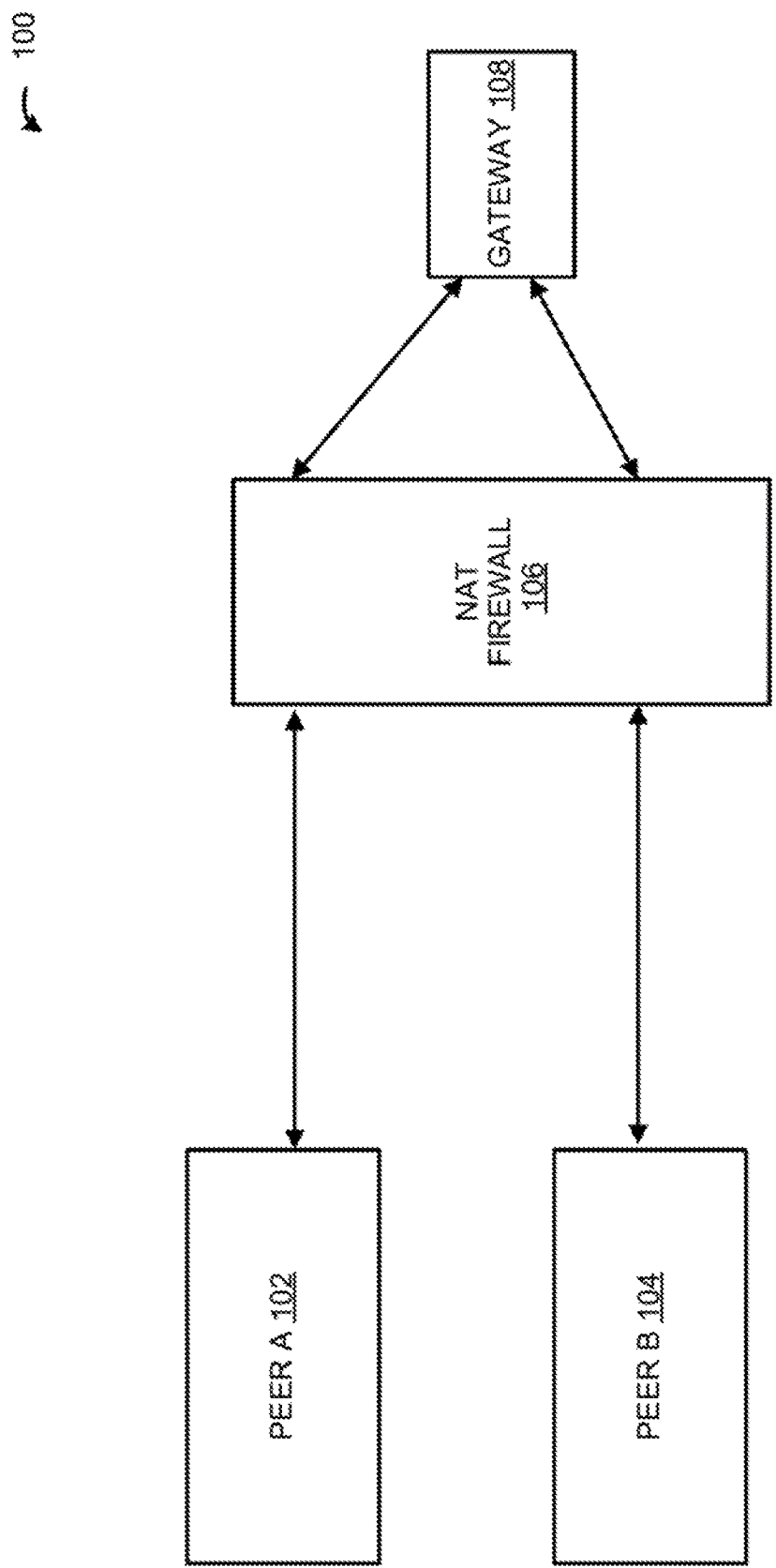
FIG. 1 is a block diagram illustrating high level architecture of a system for local peer to peer direct connection in NAT and overlay network, according to one embodiment.

FIG. 1 is a block diagram illustrating high level architecture of a system 100 for Local Peer to Peer Direct Connection in NAT and overlay network, according to one embodiment. In a peer to peer overlay networks, hosts or clients initiate sessions to peer nodes and also accept sessions initiated by peer nodes. An endpoint is a session-specific IP address: port tuple on the host or client. The overlay endpoint residing on a particular host is represented differently for each IP protocol viz. IPv4 and IPv6. Furthermore, the endpoints for each overlay that a host participates in have different IP and port tuples. When a client such as peer A 102 in a private network initiates an outgoing session to another client such as peer B 104 in the public network through a NAT device such as NAT firewall 106, the NAT firewall 10 assigns a public endpoint to translate the private endpoint so that subsequent response packets from the external client can be received by the NAT, translated, and forwarded to the private endpoint. This mapping is performed for the duration of the session. The NAT device filters out packets not destined to the internal address associated with the peer B 104 such as X:x, where X represents the IP address and x represents the port. Peer to peer application is designed to work effectively even as peering nodes are located in distinct IP address networks, connected by one or more NATs. There are various methods of implementing peer-to-peer communication in the presence of a NAT device, however, the most reliable method is to make the peer-to peer communication like a client/server communication through relaying.

The most reliable method of peer to peer communication across NAT is to make the communication look to the network like standard client/server communication, through relaying. Suppose two clients such as peer A 102 and peer B 104 have each initiated TCP or UDP connections to a gateway 108, at the gateway's global IP address and port number. The peers may reside on separate private networks, and their respective NATs prevent either peers from directly initiating a connection to the other. If the direct connection attempt fails, the peers can use the gateway, 108 to relay messages. For example, to send a message to peer B 104, peer A 102 sends the message to the gateway 108 along its already-established client/server connection, and the gateway 108 forwards the message on to peer B 104 using its existing client/server connection with peer B 104. Relaying works as long as both peers can connect to the gateway 108.

Figure 2:
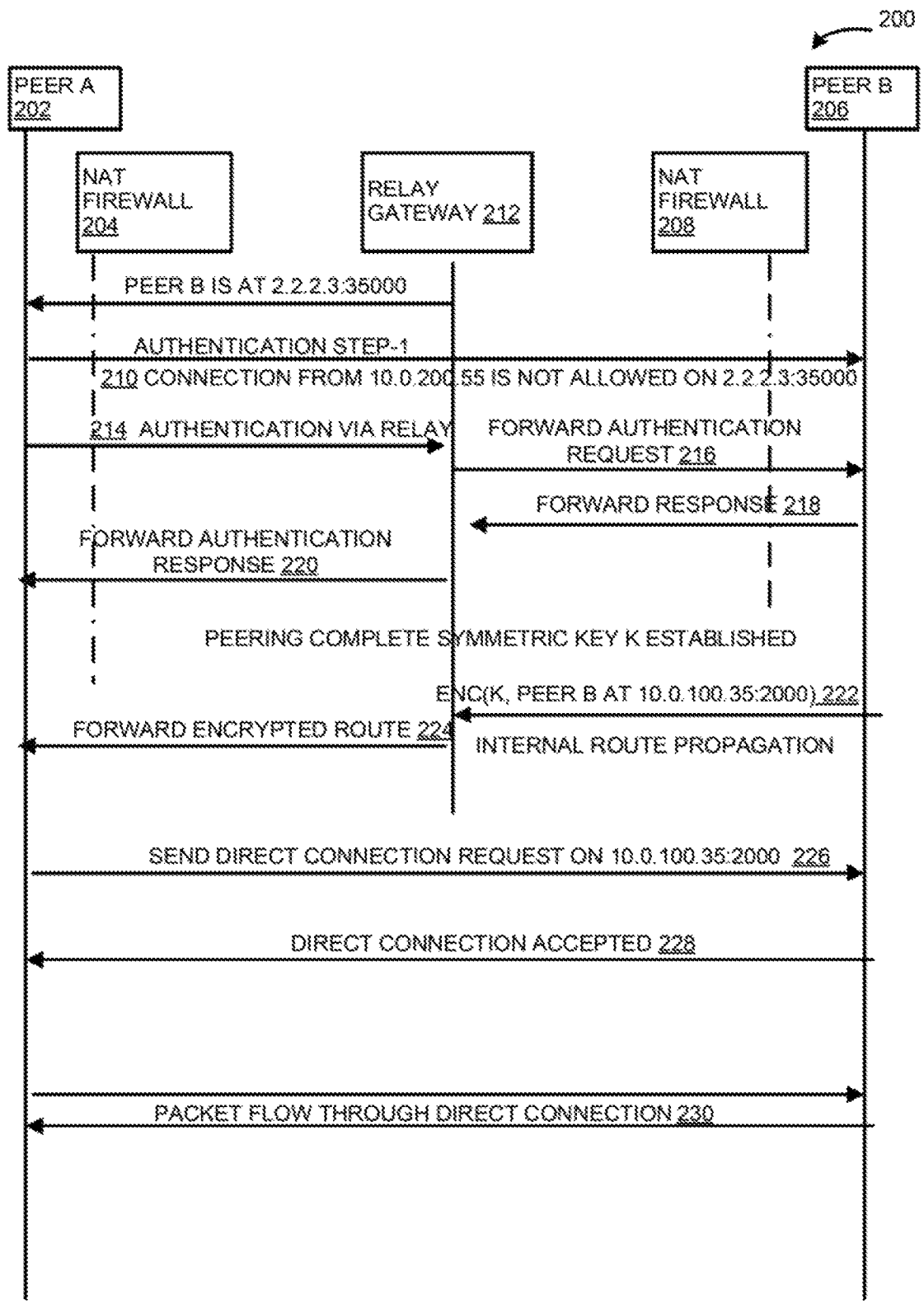
FIG. 2 is a flowchart illustrating Local Peer to Peer Direct Connection in NAT and overlay network, according to one embodiment.

FIG. 2 is a flowchart illustrating Local Peer to Peer Direct Connection in NAT and overlay network, according to one embodiment. Peer A 202 is behind NAT firewall 204 and peer B 206 is behind NAT firewall 208. When a peer in a private network initiates an outgoing session to a client in the public network through a NAT device, the NAT device assigns a public endpoint to translate the private endpoint so that subsequent response packets from the external client can be received by the NAT, translated, and forwarded to the private endpoint. This mapping is performed for the duration of the session. The NAT filters out packets not destined to the internal address associated with the client such as peer A 202 '10.0.200.5:20000', where '10.0.200.5' represents the IP address of peer A 202 and '20000' represents the port. Peer B 206 is at '2.2.2.3:35000', where '2.2.2.3' represents the IP address of peer B 206 and '35000' represents the port. At 210, connection from peer A 202 '10.0.200.55:5000' is not allowed on peer B 206 '2.2.2.3:35000'. The peer A 202 and peer B 206 reside on separate private networks, and their respective NATs prevent either peer from directly initiating a connection to the other. Instead of attempting a direct connection, the two peers use relay gateway 212 to relay messages between them. At 210, first step authentication is performed, from peer A 202 '10.0.200.55:5000' an authentication request via relay 214 is sent to the relay gateway 212. The authentication request is forwarded 216 from the relay gateway 212 to the peer B 206. The peer B 206 authenticates the request received, and the authentication response is forwarded 218 from the peer B 206 to the relay gateway 212. The authentication response is forwarded 220 from the relay gateway 212 to the peer A 202. This process is referred to as peering, since a voluntary interconnection is established between the peers behind respective NAT. An agreement by two or more networks to peer is instantiated by a physical interconnection of the networks, an exchange of routing information through the relay gateway 212 establishes a connection between the peers.

The connection established between the peers may be an encrypted path. Using an encryption algorithm with inputs such as secret key 'K' and the peer B 206 at 10.0.100.35:2000 is provided 222 to establish the encrypted path. The encrypted path is established from peer B 206 to the relay gateway 214 at the IP address '10.0.100.35' and the port '2000'. This is referred to as internal route propagation. The established encrypted path is forwarded 224 from the relay gateway 214 to the peer A 202. At 226, a direct connection request is sent on the established encrypted path at '10.0.100.35:2000' from the peer A 202 to peer B 206. At 228, the peer B 206 connection is accepted and the connection acceptance information is sent from peer B 206 to the peer A 202. At 230, once the direct connection is established, packet or message flow is directly sent and received between the peer A 202 and the peer B 206. For example, to send a message to peer B 206, peer A 202 simply sends the message directly in the already-established client/server connection.

Figure 3:
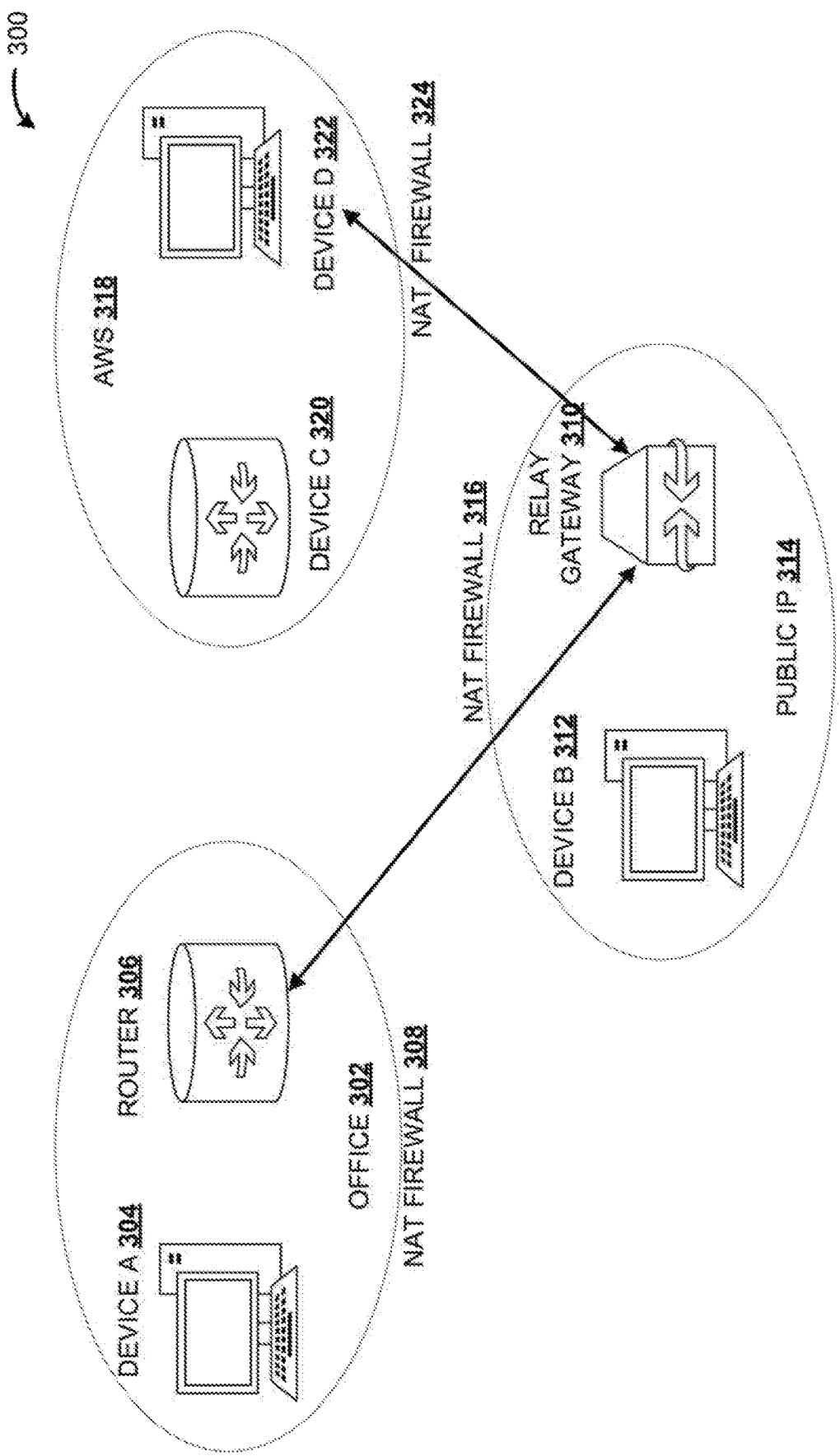
FIG. 3 illustrates a use case for generic deployment in NAT and overlay network, according to one embodiment.

FIG. 3 illustrates a use case for generic deployment in NAT and overlay network, according to one embodiment. Nodes or clients or peers on private networks can connect to other nodes on the same private network, and they can usually open TCP or UDP connections to "well-known" nodes in the global address realm. NATs on the path allocate temporary public endpoints for outgoing connections, and translate the addresses and port numbers in packets comprising those sessions, while generally blocking all incoming traffic unless otherwise specifically configured. A session endpoint for TCP or UDP is an (IP address, port number) pair, and a particular session is uniquely identified by its two session endpoints. The direction of a session is normally the flow direction of the packet that initiates the session: the initial SYN packet for TCP, or the first user datagram for UDP. Of the various flavors of NAT, the most common type is traditional or outbound NAT, which provides an asymmetric bridge between a private network and a public network.

NATs by default allows only outbound sessions to traverse the NAT: incoming packets are dropped unless the NAT identifies them as being part of an existing session initiated from within the private network. Outbound NAT conflicts with peer-to-peer protocols because when both peers desiring to communicate are "behind" (on the private network side of) two different NATs, whichever peer tries to initiate a session, the other peer's NAT rejects it. NAT traversal entails making peer to peer sessions look like "outbound" sessions to both NATs. Outbound NAT has two sub-varieties: Basic NAT, which only translates IP addresses, and Network Address/Port Translation (NAPT), which translates entire session endpoints.

The private network office 302 includes devices such as device A 304 and a router 306. The private network office 302 is behind a NAT firewall 308. Relay gateway 310 and the device B 312 are in public IP 314 network behind a NAT firewall 316. Amazon Web Service (AWS) 318 is a cloud private network that includes device C 320 and device D 322 behind NAT firewall 324. Suppose node router 306 wants to establish a direct connection with device D 322, and the direct connection may be a TCP or UDP connection. The router 306 does not know the existence of device D 322, and therefore the relay gateway 310 that is reachable in the public IP 314 is contacted by the router 306 to establish a connection with the device D 322. The router 306 initiates an authentication request via relay mode to the gateway 310. The gateway 310 forwards the authentication request to the device D 322. The device D 322 authenticates the request received from the router 306 and send an authentication response to the router 306 via the relay gateway 310. Peering between the router 306 and the device D 322 is established by using the symmetric encryption algorithm for establishing an encryption path from the router 306 to the device D 322.

The encrypted route is forwarded to the router 306. A direct connection request is sent from the router 306 to the device D 322. To enable direct communication between two devices or peers when they are behind NAT/NAT firewall and the relay gateway 310 is on the other side of the NAT/NAT firewall is performed by propagating internal routes to the peers or devices. Internal route propagation happens only when direct route has not been established between the peers at the end of the authentication step. Once the direct connection is established between the router 306 and the device D 322, the packet exchanges takes place directly between the device D 322 D and the router 306.

Figure 4:
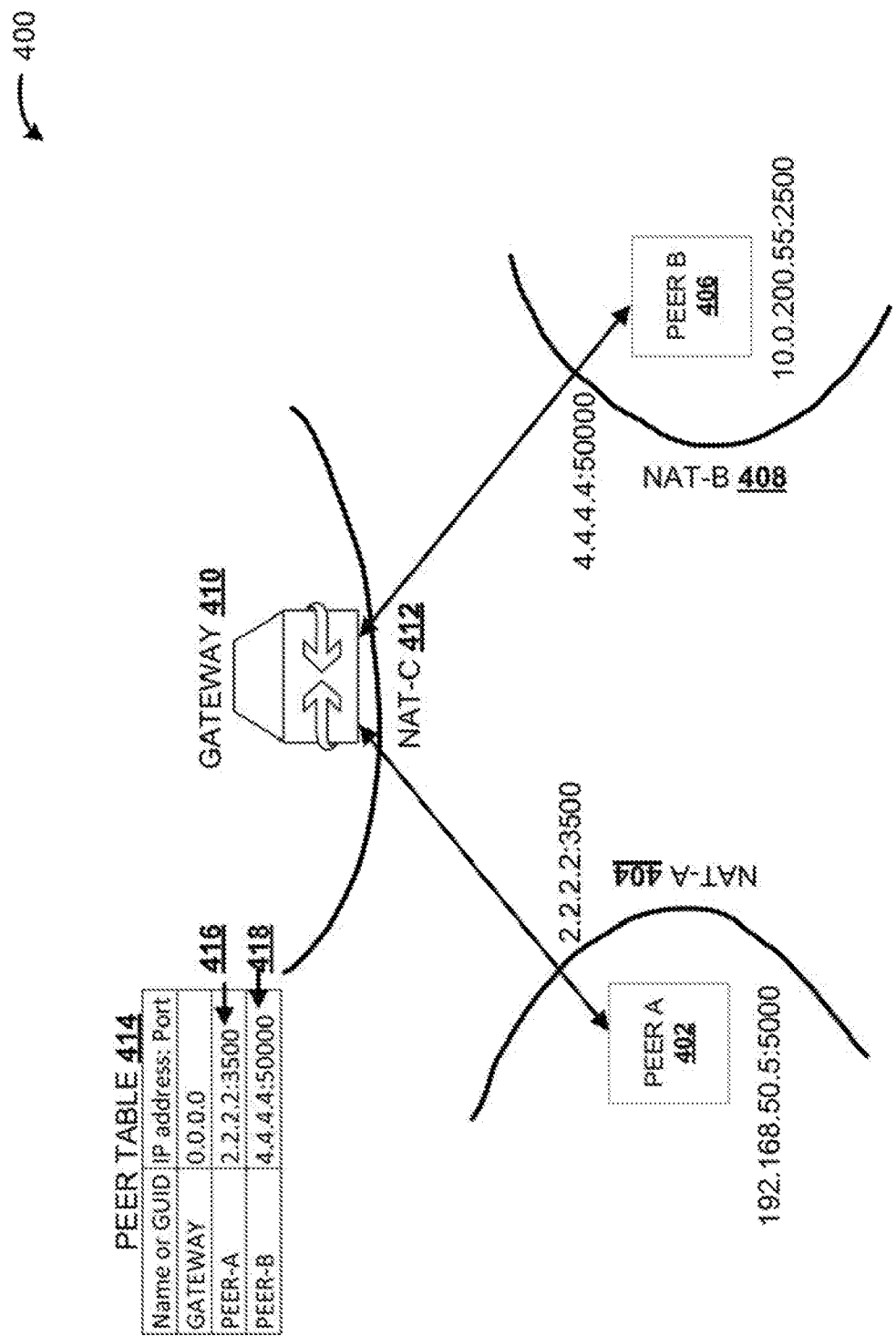
FIG. 4 illustrates a use case for generic deployment in NAT and overlay network, according to one embodiment.

FIG. 4 illustrates a use case for generic deployment in NAT and overlay network, according to one embodiment. Consider a scenario where peer A 402 is behind NAT-A 404, here the private IP address of peer A 402 is '192.168.50.5:5000' and the public IP address of peer A 402 is '2.2.2.2:

3500'. Peer B 406 is behind NAT-B 408, here the private IP address of peer B 406 is '10.0.200.55:2500' and the public IP address of peer B 406 is '4.4.4.4:50000'. Gateway 410 is outside both the NAT-A 404 and NAT-B 408, and the gateway 410 may be behind NAT-C 412. Peer A 402 may not directly connect with peer B 406.

Traversal using relay NAT (TURN) is a protocol that assists in traversal of NAT or firewalls for multimedia applications using TCP and UDP protocol. TURN allows a client to obtain IP addresses and ports from such a relay. Gateway 410 generates a peer table 414 with IP address and port information of the peers communicating with the gateway 410. When the peer A 402 attempts to establish a connection with peer B, it is not allowed. Hence, peer A 402 send an authentication request via relay mechanism to the gateway 410, and the gateway 410 forwards the authentication request to the peer B 406. When the authentication request is received from the peer A 402, the gateway 410 makes an entry of the public IP address '2.2.2.2:3500' of the peer A 402 in the peer table 414 as shown in row 416. The peer B 406 performs authentication of the peer A 402, and the response to the authentication request is forwarded to the peer A 402. When the authentication response is received from the peer B 406, the gateway 410 makes an entry of the public IP address '4.4.4.4:50000' of the peer B 406 in the peer table 414 as shown in row 418. The updated peer table 414 is propagated from the gateway 410 to the peer A 402 and the peer B 406.

Once peer A 402 is authenticated by peer B 406, a symmetric encryption is performed by peer B 406 using a symmetric key to establish an encrypted authenticated path between the peer B 406 and the peer A 402. The peer B 406 propagates its private IP address '10.0.200.55:2500' through the established encrypted authenticated path to the peer A 402, and this is referred to as internal route propagation. When the peer A 402 receives the private IP address '10.0.200.55:2500' of the peer B 406, a direct connection request is sent from peer A 402 to peer B 406 using the private IP address of peer B 406. Once the direct connection is established between the peer A 402 and the peer B 406, the packets and messages are sent between the peer A 402 and the peer B 406 directly without an intermediate gateway 410. Here, the network could operate in a headless mode when the gateway 410 goes offline, where the peer A 402 and the peer B 406 directly communicate with each other.

Figure 5:
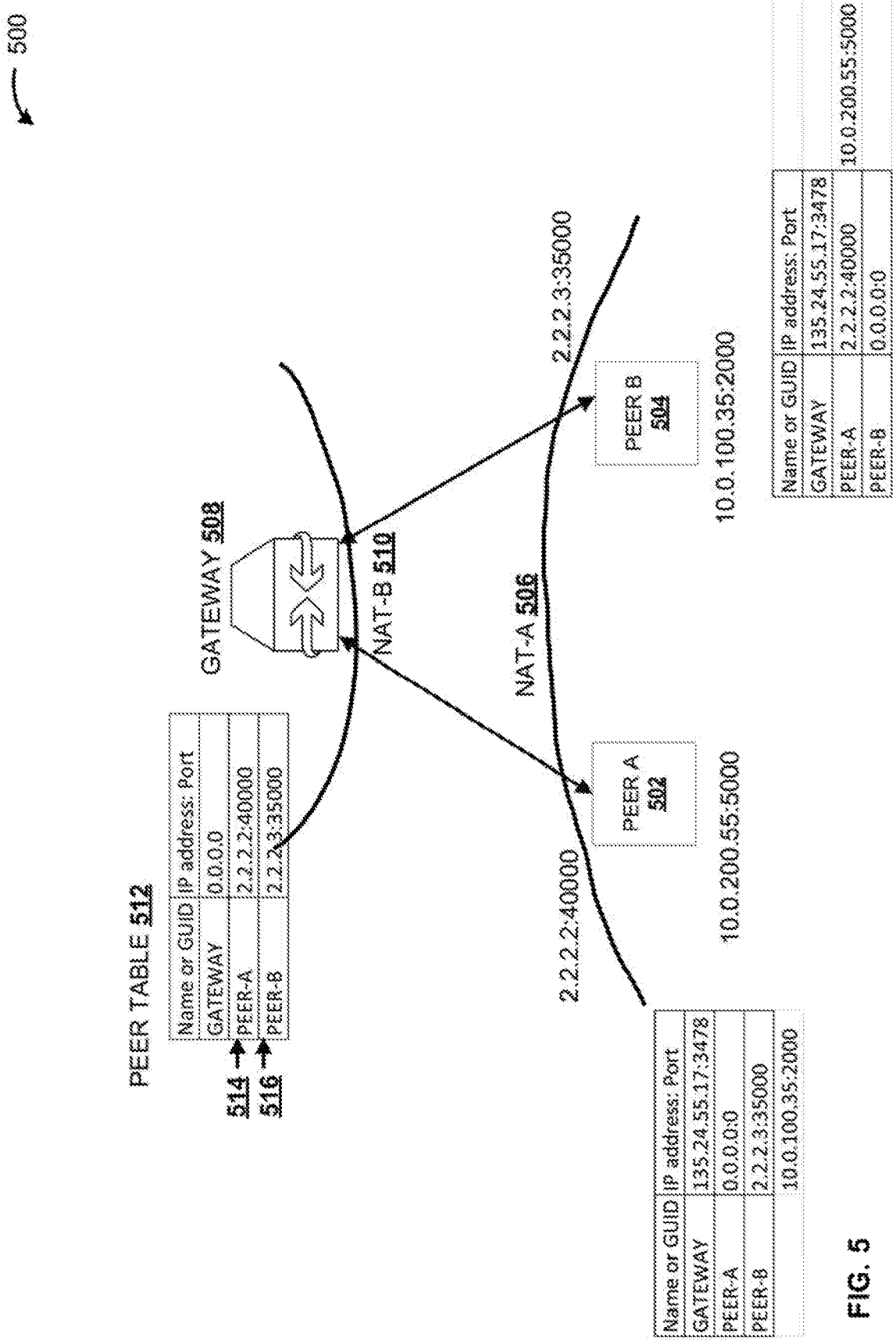
FIG. 5 illustrates a use case for Local Peer to Peer Direct Connection in NAT and overlay network, according to one embodiment.

FIG. 5 illustrates a use case for Local Peer to Peer Direct Connection in NAT and overlay network, according to one embodiment. Consider a scenario where both peer A 502 and peer B 504 are behind the same NAT-A firewall 506 and a gateway 508 is behind a different NAT-B firewall 510. The peer A 502 is behind the NAT-A firewall 506, here the private IP address of peer A 502 is '10.0.200.55:5000' and the public IP address of peer A 502 is '2.2.2.2:40000'. Peer B 504 is also behind the same NAT-A firewall 506, here the private IP address of peer B 506 is '10.0.100.35:2000' and the public IP address of peer B 506 is '2.2.2.3:35000'. Gateway 508 is behind NAT-B 510. Peer A 402 may not directly connect with peer B 406.

Gateway 508 generates a peer table 512 with IP address and port information of the peers communicating with the gateway 508. When the peer A 502 attempts to establish a connection with peer B 504, it is not allowed. Hence, peer A 502 send an authentication request via relay mechanism to the gateway 508, and the gateway 508 forwards the authentication request to the peer B 504. When the authentication request is received from the peer A 502, the gateway 508 makes an entry of the public IP address '2.2.2.2:4000' of the peer A 502 in the peer table 512 as shown in row 514. The peer B 504 performs authentication of the peer A 502, and the response to the authentication request is forwarded to the peer A 502. When the authentication response is received from the peer B 504, the gateway 508 makes an entry of the public IP address '2.2.2.3:35000' of the peer B 504 in the peer table 512 as shown in row 516. The updated peer table 512 is propagated from the gateway 508 to the peer A 502 and the peer B 504.

Once the peer A 502 is authenticated by peer B 504, a symmetric encryption is performed by peer B 504 using a symmetric key to establish an encrypted authenticated path between the peer B 504 and the peer A 502. The peer B 504 propagates its private IP address '10.0.100.35:2000' through the established encrypted authenticated path to the peer A 502, and this is referred to as internal route propagation. The public IP address '2.2.2.3:35000' of peer B 504 is updated in the peer table 512 and the peer table 512 is propagated from the gateway 508 to the peer A 502. When the peer A 502 receives the private IP address '10.0.100.35:2000' of the peer B 504, a direct connection request is sent from peer A 502 to peer B 504 using the private IP address of peer B 504. The public IP address '2.2.2.2:40000' of peer A 502 is updated in the peer table 512 and the peer table 512 is propagated from the gateway 508 to the peer B 504. Once the direct connection is established between the peer A 502 and the peer B 504, the packets and messages are transferred between the peer A 502 and the peer B 504 directly without an intermediate gateway 508. Here, the network could operate in a headless mode when the gateway 508 goes offline, where the peer A 502 and the peer B 504 directly communicate with each other. Therefore, the connection which was initially an indirect connection request between the peers via the gateway 508, eventually switches to a direct mode connection between the peers.

Figure 6:
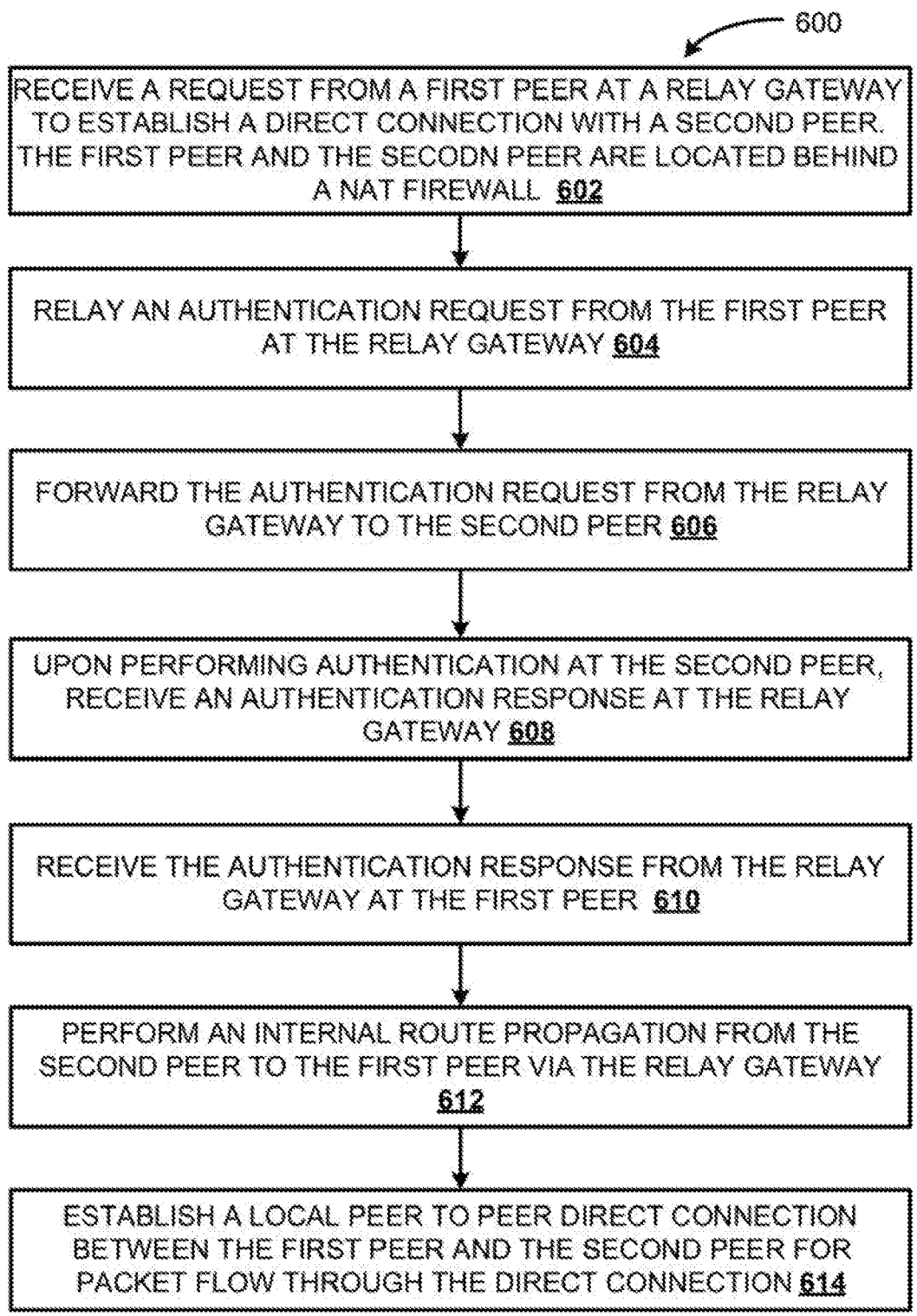
FIG. 6 is a flowchart illustrating method of Local Peer to Peer Direct Connection in NAT and overlay network, according to one embodiment.

FIG. 6 is flowchart 600 illustrating method of Local Peer to Peer Direct Connection in NAT and overlay network, according to one embodiment. At 602, a request is received from a first peer at a relay gateway to establish a direct connection with a second peer. The first peer and the second peer are located behind a NAT firewall. At 604, an authentication request is relayed from the first peer at the relay gateway. At 606, the authentication request is forwarded from the relay gateway to the second peer. Upon performing authentication at the second peer, at 608, an authentication response is received at the relay gateway. At 610, the authentication response is received from the relay gateway at the first peer. At 612, an internal route propagation is performed from the second peer to the first peer via the relay gateway. At 614, a Local Peer to Peer Direct Connection is established between the first peer and the second peer for packet flow through the direct connection.

Local Peer to Peer Direct Connection in NAT'd and overlay network has the following advantages. It eliminates the gateway as the bottleneck once a direct connection is established between the peers. The bottleneck manifests even with a single packet. The gateway is essentially dealing with two packets (one inbound and the other outbound). It gets accentuated when encryption and decryption is involved and gets magnified manifold when there are many peers communicating simultaneously via the gateway. Relay gateway going down does not disrupt connectivity between peers. Peers can operate in headless mode even as the gateway is brought back online. Relay gateway does not need to see (decrypt and re-encrypt) all packets. This enhances the security further.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
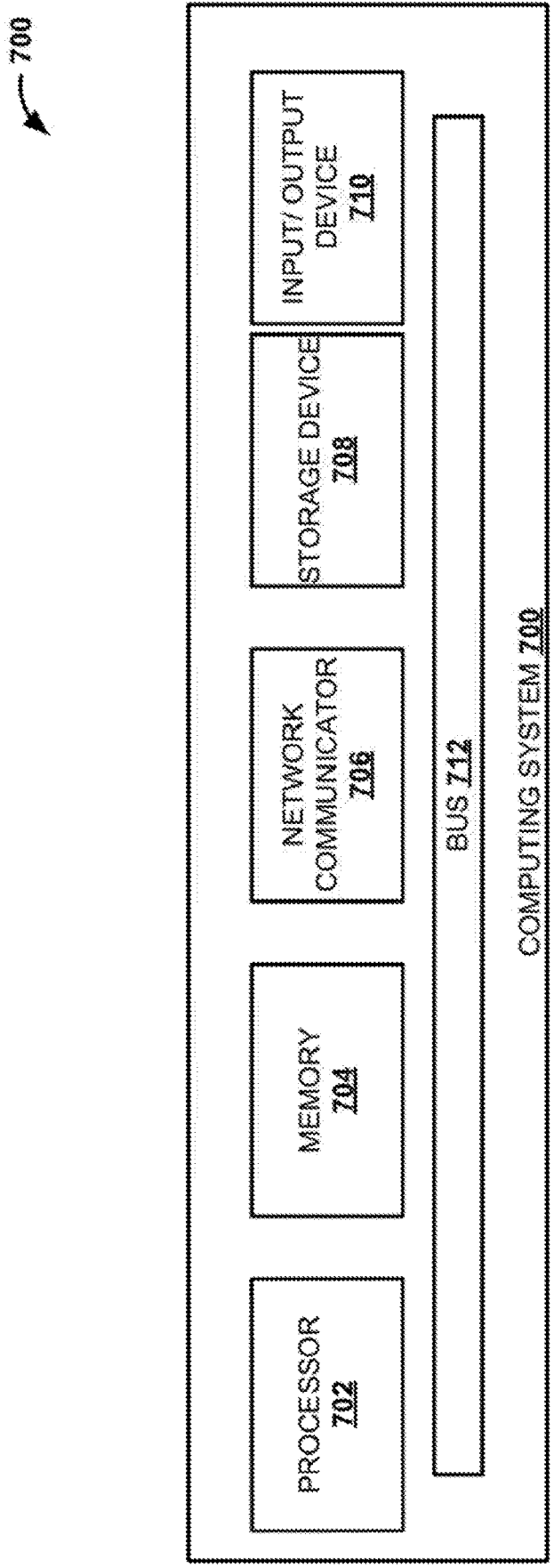
FIG. 7 is a block diagram of an exemplary computer system, according to one embodiment.

FIG. 7 is a block diagram illustrating a computing system 700 consistent with implementations of the current subject matter. As shown in FIG. 7, the computing system 700 can include a processor 702, a memory 704, network communicator 706, a storage device 708, and input/output devices 710. The processor 702, the memory 704, network communicator 706, the storage device 708, and the input/output device 710 can be interconnected via a system bus 712. The processor 702 is capable of processing instructions for execution within the computing system 700. Such executed instructions can implement one or more components of, for example, application A. In some example embodiments, the processor 702 can be a single-threaded processor. Alternately, the processor 702 can be a multi-threaded processor. The processor 702 is capable of processing instructions stored in the memory 704 and/or on the storage device 708 to display graphical information for a user interface provided via the input/output device 710.

The memory 704 is a computer readable medium such as volatile or non-volatile that stores information within the computing system 700. The memory 704 can store instructions and/or other data associated with the processes disclosed herein. The storage device 708 is capable of providing persistent storage for the computing system 700. The storage device 708 can be a hard disk device, an optical disk device, or a tape device, or other suitable persistent storage means. The input/output device 710 provides input/output operations for the computing system 700. In some example embodiments, the input/output device 710 includes a keyboard and/or pointing device. In various implementations, the input/output device 710 includes a display unit for displaying graphical user interfaces.

According to some example embodiments, the input/output device 710 can provide input/output operations for a network device. For example, the input/output device 710 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 710. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented system for establishing a direct peer-to-peer connection between at least a first peer computer and a second peer computer residing on two disparate network address translation (NAT) enabled overlay networks controlled respectively by at least one NAT-based firewall, said system comprising:
a processor;
a memory module communicably coupled to said processor, said memory module storing computer program code, and wherein said memory module and said computer program code stored therein are configured, with said processor, to:
trigger said first peer computer to transmit an authentication request to a predetermined relay gateway communicably coupled to said first peer computer and said second peer computer;
trigger said relay gateway to process said authentication request, and forward said authentication request to said second peer computer;
trigger said second peer computer to process said authentication request, generate an authentication response corresponding to said authentication request, and transmit said authentication response to said relay gateway;
trigger said relay gateway to process said authentication response, and transmit said authentication response to said first peer computer;
trigger said second peer computer to establish an encrypted path to said relay gateway, and trigger said relay gateway to extend said encrypted path to said first peer computer, and further trigger said second peer computer to transmit a private Internet Protocol (IP) address of said second peer computer to said first peer computer over said encrypted path;
trigger said first peer computer to transmit, independent of said relay gateway, a direct connection request to said second peer computer, based on said private IP address of said second peer computer;
establish said direct peer-to-peer connection between said first peer computer and said second peer computer, in response to said second peer computer accepting said direct connection request, and thereby enabling said first peer computer and said second peer computer to operate in a headless mode independent of said relay gateway, by inter-communicating via said direct peer-to-peer connection.

2. The system as claimed in claim 1, wherein said processor is further configured to:
trigger said relay gateway to update a peer table stored at said relay gateway, with at least a public IP address of said first peer computer, in response to said first peer computer transmitting said authentication request to said relay gateway; and
trigger said relay gateway to update said peer table stored at said relay gateway, with at least a public IP address of said second peer computer, in response to said second peer computer transmitting said authentication response to said relay gateway.

3. The system as claimed in claim 1, wherein said second peer computer establishes said encrypted path using a predetermined symmetric encryption algorithm and a predefined secret key.

4. The system as claimed in 1, wherein said processor triggers said second peer computer to perform internal route propagation by way of transmitting said private IP address to said first peer computer over said encrypted path.

5. A computer-implemented method for establishing a direct peer-to-peer connection between at least a first peer computer and a second peer computer residing on two disparate network address translation (NAT) enabled overlay networks controlled respectively by at least one NAT-based firewall, said method comprising the following computer-implemented steps:
- triggering, by a processor, said first peer computer to transmit an authentication request to a predetermined relay gateway communicably coupled to said first peer computer and said second peer computer;
- triggering, by said processor, said relay gateway to process said authentication request, and forward said authentication request to said second peer computer;
- triggering, by said processor, said second peer computer to process said authentication request, generate an authentication response corresponding to said authentication request, and transmit said authentication response to said relay gateway;
- triggering, by said processor, said relay gateway to process said authentication response and transmit said authentication response to said first peer computer;
- triggering, by said processor, said second peer computer to establish an encrypted path to said relay gateway, and trigger said relay gateway to extend said encrypted path to said first peer computer, and further triggering, by said processor, said second peer computer to transmit private Internet Protocol (IP) address of said second peer computer to said first peer computer over said encrypted path;
- triggering, by said processor, said first peer computer to transmit, independent of said relay gateway, a direct connection request to said second peer computer, based on said private IP address of said second peer computer;
- establishing, by said processor, said direct peer-to-peer connection between said first peer computer and said second peer computer, in response to said second peer computer accepting said direct connection request, and thereby enabling said first peer computer and said second peer computer to operate in a headless mode independent of said relay gateway, by inter-communicating via said direct peer-to-peer connection.

6. The method as claimed in claim 5, wherein:
- the step of triggering said relay gateway to process said authentication request, further includes the step of triggering said relay gateway to update a peer table stored at said relay gateway, with at least a public IP address of said first peer computer, in response to said first peer computer transmitting said authentication request to said relay gateway; and
- the step of triggering said relay gateway to process said authentication response, further includes the step of triggering said relay gateway to update said peer table stored at said relay gateway, with at least a public IP address of said second peer computer, in response to said second peer computer transmitting said authentication response to said relay gateway.

7. The method as claimed in claim 5, wherein the step of triggering said second peer computer to establish said encrypted path to said relay gateway, further includes the step of triggering, by said processor, said second peer computer to establish said encrypted path using a predetermined symmetric encryption algorithm and a predefined secret key.

8. The method as claimed in claim 5, wherein the method further includes the step of triggering, by said processor, said second peer computer to perform internal route propagation by way of transmitting said private IP address to said first peer computer over said encrypted path.

9. A non-transitory computer-readable storage medium having computer-executable instructions stored thereon, said computer-executable instructions, when executed by a processor, cause said processor to establish a direct peer-to-peer connection between at least a first peer computer and a second peer computer residing on two disparate network address translation (NAT) enabled overlay networks controlled respectively by at least one NAT-based firewall, by:
- triggering said first peer computer to transmit an authentication request to a predetermined relay gateway communicably coupled to said first peer computer and said second peer computer;
- triggering said relay gateway to process said authentication request, and forward said authentication request to said second peer computer;
- triggering said second peer computer to process said authentication request, generate an authentication response corresponding to said authentication request, and transmit said authentication response to said relay gateway;
- triggering said relay gateway to process said authentication response, and transmit said authentication response to said first peer computer;
- triggering said second peer computer to establish an encrypted path to said relay gateway, and trigger said relay gateway to extend said encrypted path to said first peer computer, and further trigger said second peer computer to transmit a private Internet Protocol (IP) address of said second peer computer to said first peer computer over said encrypted path;
- triggering said first peer computer to transmit, independent of said relay gateway, a direct connection request to said second peer computer, based on said private IP address of said second peer computer;
- establishing said direct peer-to-peer connection between said first peer computer and said second peer computer, in response to said second peer computer accepting said direct connection request, and thereby enabling said first peer computer and said second peer computer to operate in a headless mode independent of said relay gateway, by inter-communicating via said direct peer-to-peer connection.

10. The computer-executable instructions as claimed in calm 9, wherein said computer-executable instructions, when executed by said processor, cause said processor to:
- trigger said relay gateway to update a peer table stored at said relay gateway, with at least a public IP address of said first peer computer, in response to said first peer computer transmitting said authentication request to said relay gateway;
- trigger said relay gateway to update said peer table stored at said relay gateway, with at least a public IP address of said second peer computer, in response to said second peer computer transmitting said authentication response to said relay gateway;
- trigger said second peer computer to establish said encrypted path using a predetermined symmetric encryption algorithm and a predefined secret key; and
- trigger said second peer computer to perform internal route propagation by way of transmitting said private IP address to said first peer computer over said encrypted path.

* * * * *